United States Patent [19]

Chung

[11] Patent Number: 5,277,524
[45] Date of Patent: Jan. 11, 1994

[54] PUNCHER

[76] Inventor: Ching-Pao Chung, No. 120-18, Yu Che, Yu Che Li, Ma Tou Chen, Tainan Hsien, Taiwan

[21] Appl. No.: 26,285

[22] Filed: Mar. 4, 1993

[51] Int. Cl.⁵ .................. B23B 39/16; B23B 47/30
[52] U.S. Cl. .......................... 408/46; 408/53; 408/111; 408/124
[58] Field of Search .............. 408/42, 46, 53, 111, 408/138, 124, 224, 225

[56] References Cited

U.S. PATENT DOCUMENTS

| | | | |
|---|---|---|---|
| 1,521,158 | 12/1924 | King | 408/42 |
| 2,719,461 | 10/1955 | Hawker | 408/111 |
| 4,932,814 | 6/1990 | York | 408/111 |

FOREIGN PATENT DOCUMENTS

| | | | |
|---|---|---|---|
| 2701516 | 7/1978 | Fed. Rep. of Germany | 408/46 |
| 642926 | 9/1928 | France | 408/53 |
| 968362 | 9/1964 | United Kingdom | 408/42 |

*Primary Examiner*—Daniel W. Howell
*Attorney, Agent, or Firm*—Morton J. Rosenberg; David I. Klein

[57] ABSTRACT

A puncher comprising two drills held on chucks attached on shafts combined with gears provided in two front seats and a rear seat able to be changed in their position so as to change the distance between the two drills, the front seats and the rear seat being connected with a main seat which is possible to be moved up and down by means of a vertical threaded rod and a support rod so as to lower down the two drills to punch holes in one of many distances adjustable in papers placed on a bottom base and pinched immovable in a pincher on the base.

1 Claim, 5 Drawing Sheets

PUNCHER

BACKGROUND OF THE INVENTION

A conventional puncher shown in FIG. 5 comprises a body 11, a pressing rod 12, two punching rods 13, 13 a pressing handle 14, support rod 15 and plastic bottom cover 16.

The body 11 has two raised-up blocks 111, 111 on both sides, and an opening 112 in bottom front portion of each block 111 for papers to be punched to extend therein, a vertical hole 113 for placing the punch rod 13 with a V-shaped end, the pressing rod 12 connecting the punch rods, 13, 13 a support rod 15 for combining the pressing handle 14 pivotally connected between the two blocks 111, 111, the pressing rod 12 fixed between the two blocks 111, 111 in parallel to the support rod 15 for receiving the pressing handle 12. The plastic bottom cover 16 closes the opening bottom of the body 11.

In using, papers are inserted in the two openings 112, 112, and then the pressing handle 14 is pressed down with the support rod 15 as a pivot, lowering the punch rods 13, 13 to punch the papers and to push Punched paper bits down in the bottom cover 16 of the body 11. Then punching operation is finished However, this conventional puncher has drawbacks as listed below.

1. The distance between two holes to be punched is constant, impossible to be adjusted to cope with various distances of holes needed in papers of various size
2. The openings 112, 112 has a short height so that only a few sheets of papers may be extended therein, and many sheets of paper should be punched repeatedly for many times, taking time.
3. Many sheets of paper punched in several times may not have the same position of holes, so they cannot be piled one on the other correctly or neatly for binding.
4. In punching operion, punching-off bits of Paper may stick to the end of the punch rod and in the vertical hole of the block, hampering punching work.

SUMMARY OF THE INVENTION

In view of the disadvantageous function of the conventional punchers mentioned above, this invention has been devised to offer an improved puncher planned to have advantages as follows.

1. It has two front seats fixed with two drills, which can be adjusted in their distance by means of adjusting threaded rods so as to adjust the distance between two holes to be punched.
2. It has a pincher on a bottom base to hold a large number of sheets of paper to reduce frequency of punching and thus to save time for operation
3. Position of punched holes can be the same as best as possible, by reducing frequency of punching.
4. It has especially designed drills, with cut-off bits of paper unable to stick thereto, as the conventional puncher is able to have punched bits of paper stick to its punch rods.
5. Its drills can be changed so that holes of various sizes can be punched.
6. Its structure is simple and convenient for operating.

BRIEF DESCRIPTION OF DRAWINGS

The invention will be better understood by reference to the accompanying drawings, wherein.

DESCRIPTION OF THE PREFERRED EMBODIMENTS

Figure 1:
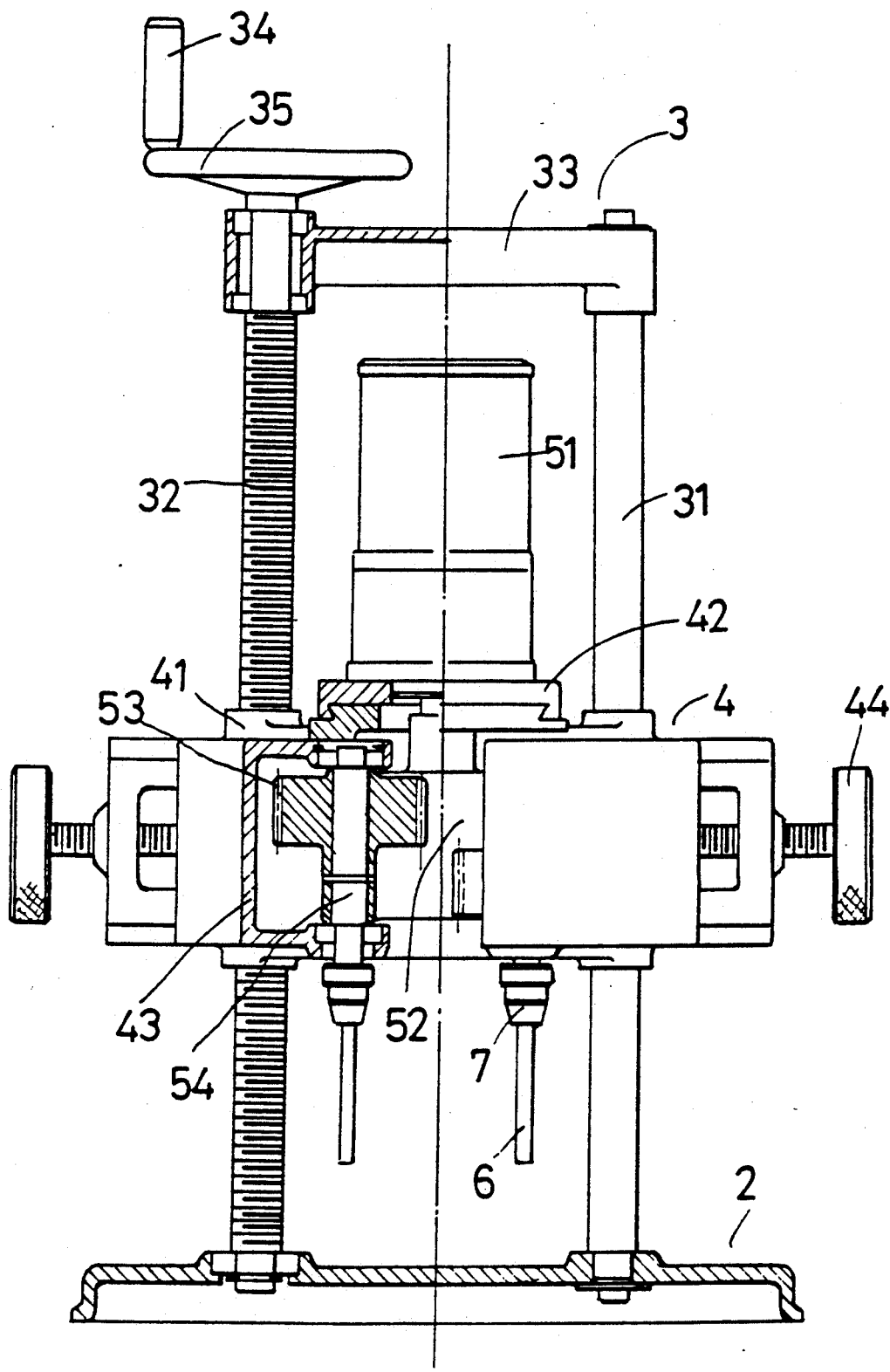
FIG. 1 is a front view of a puncher in the present invention.
Figure 2:
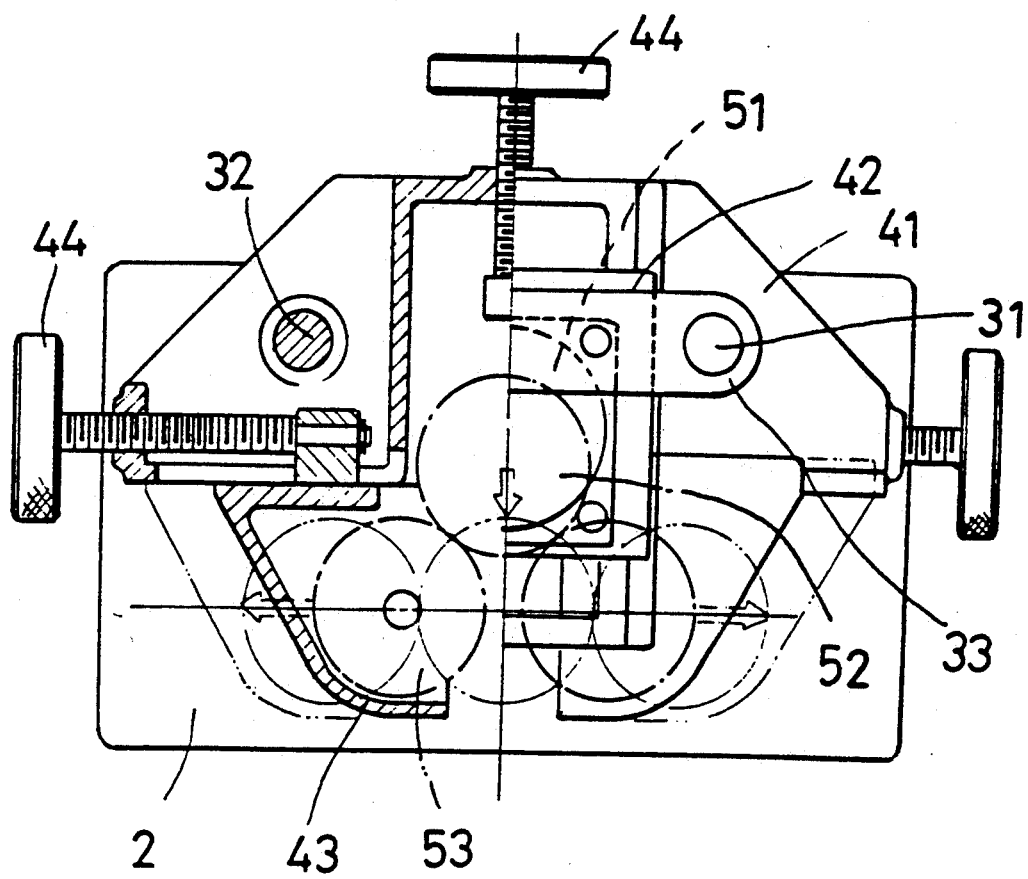
FIG. 2 is an upside view of the puncher in the present invention.
Figure 3:
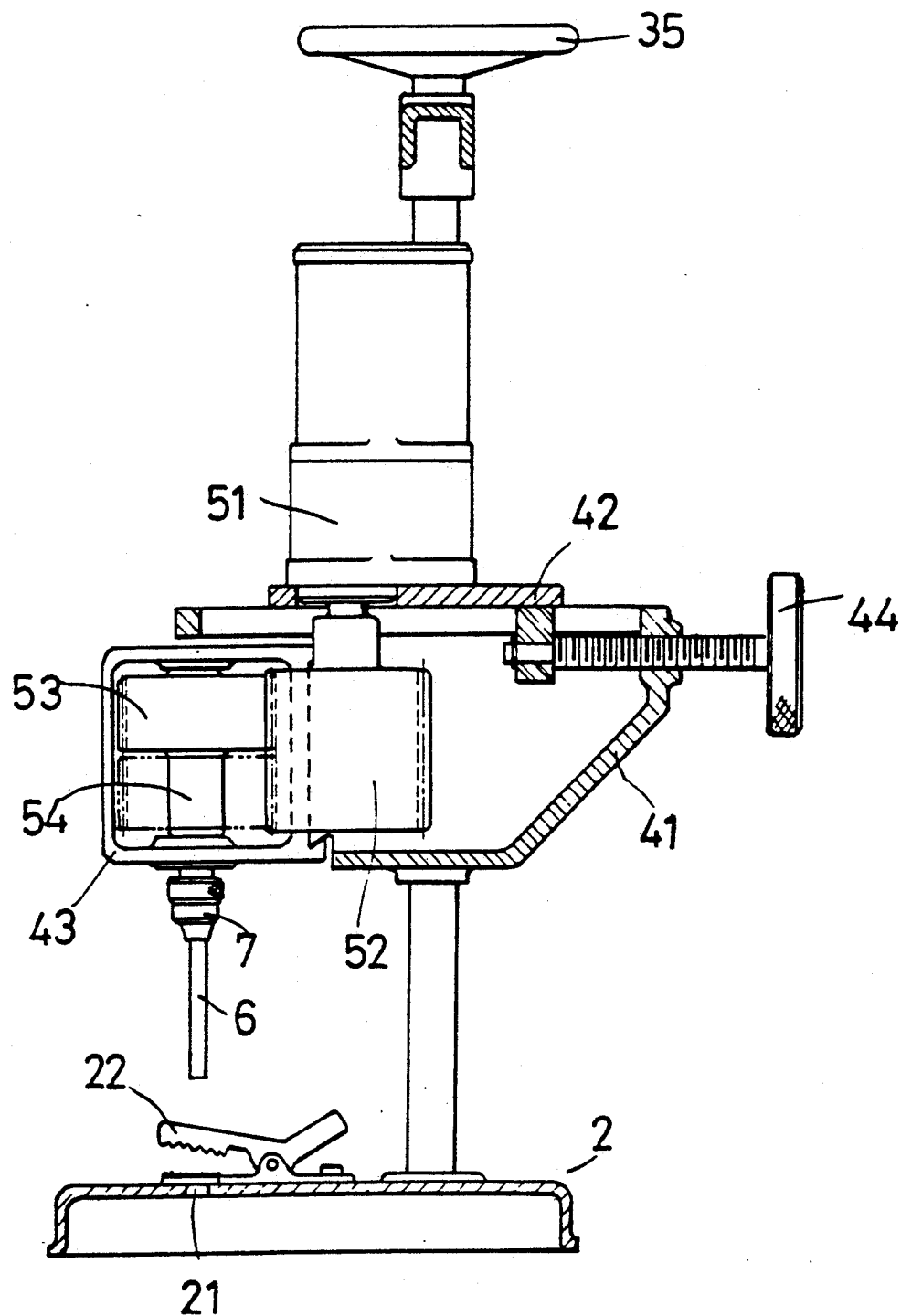
FIG. 3 is a side view of the puncher in the present invention.
Figure 4:
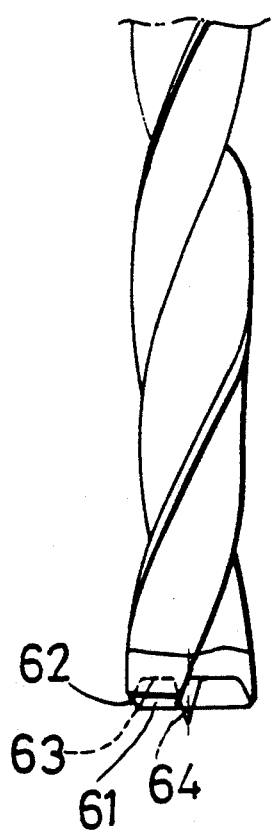
FIG. 4 is a front view of a drill in the puncher in the present invention; and,
FIG. 5 is a perspective view of a conventional puncher.
Figure 5:
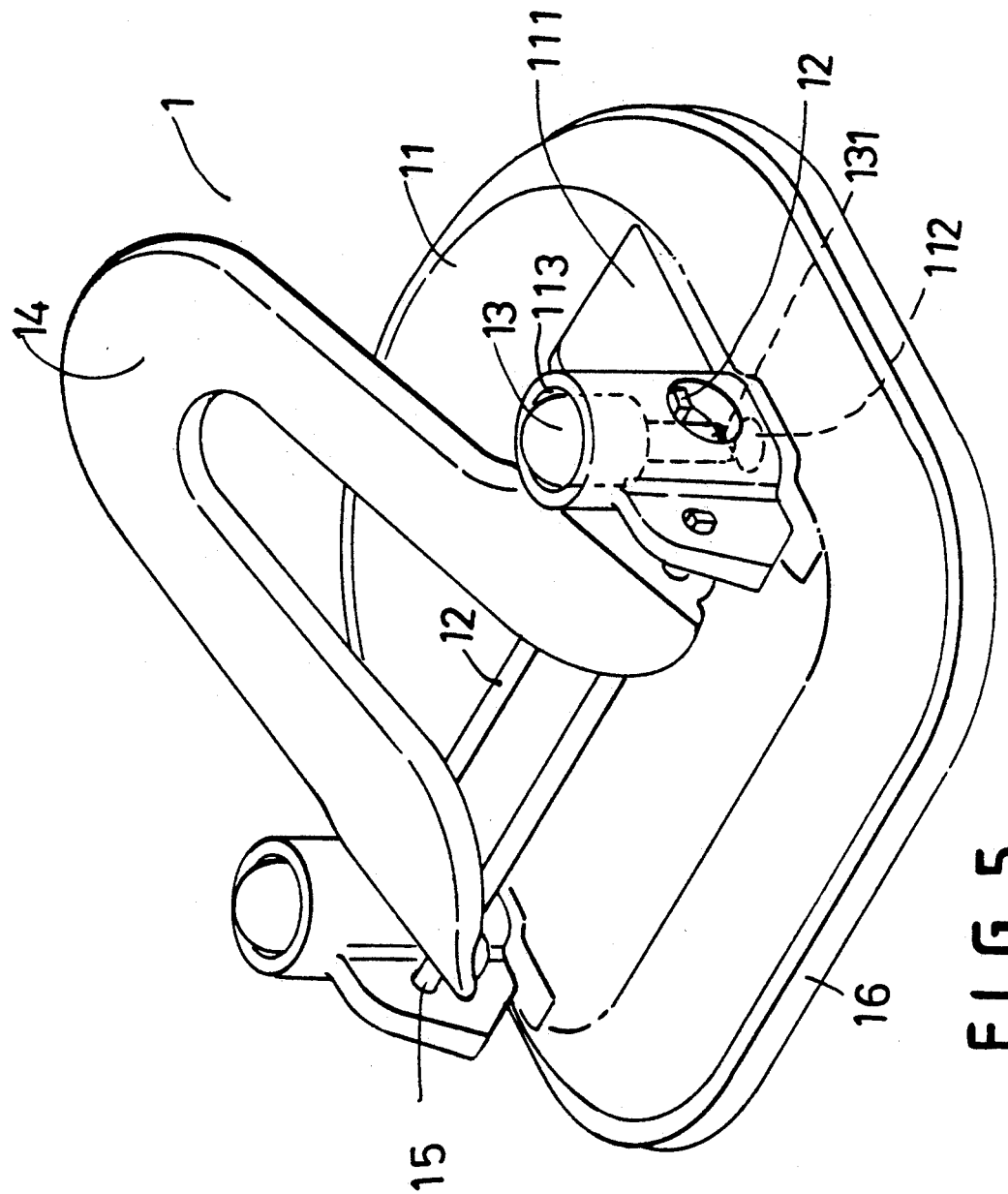

A puncher in the present invention, as shown in FIGS. 1-3, comprises a bottom base 2, an adjusting frame 3, a movable seat unit 4, a transmitting device 5, two drills 6, 6 as main components The bottom base 2 is shaped rectangular, having a vertical drill hole 21 for a drill to pass through down, and a pincher 22 for punching papers, supporting other components on it.

The adjusting frame 3 is fixed on a rear portion of the bottom base 2, having an upright support rod 31, an upright threaded rod 32 and a horizontal linking rod 33 connecting the two rods 31, 32 together to stand up parallel to each other. The threaded rod 32 has a wheel 35 with an upright grip 34 on top for turning the rod 32 to move up and down the movable seat 4.

The movable seat unit 4 consists of a main seat 41 connected with the support rod 31 and the threaded rod 32 of the adjustable frame 3, and a rear seat 42 and two front seats 43, 43 combined with the main seat 41, and an adjusting horizontal threaded rod 44 is respectively attached with the rear seat 42 and the two front seats 43, 43 so as to adjust their position.

The transmitting device 5 has a speed reducing motor 5, a main gear 52 fixed on the motor shaft, two auxiliary gears 53 fixed on shafts 514, 514 in different levels and meshing with the main gear 52, two shafts 514, 514 and two drill chucks 7, 7 for holding two drills 6, 6.

Each drill 6 is held in each drill chuck 7, having a circular blade 61 on t he circumferential edge of the end surface with a same height, a tapered edge around the blade tip 62, a central projecting point 64 extending below the circular blade and an annular groove 63 defined between the circular blade 61 and the central projecting point 64.

In using, papers are to be pinched in the pincher 22 on the bottom base 2, and then the two adjusting threaded rods 44, 44 handled to move the two front seat 43, 43 to a proper position, adjusing the distance between the two drills 6, 6 according to the hole distance needed and the main gear 52 made to mesh with the two auxiliary gears 53, 53 by adjusting the rod 44 of the rear seat 42. Next, the motor 51 is to be started to rotate the main gear 52, the two auxiliary gears 53, 53 and then the drills 6, 6. After that, the grip 34 is to be held with a hand and rotated to turn the wheel 35, lowering down the drills 6, 6 for drilling two holes in the papers pinched in the pincher 22 until the drills reach the holes 21, 21. Then the wheel 35 is to be rotated back upward, with the drills moving up out of the papers.

While the preferred embodiments of the invention have been described above, it will be recognized and understood that various modifications may be made therein and the appended claims are intended to cover all such modifications which may fall within the spirit and scope of the invention.

What is claimed is:

1. A puncher comprising:

a bottom base shaped rectangular, having two vertical holes for two drills to extend therein and a pincher for pinching papers to be punched;

an adjusting frame fixed upright on the bottom base, having a support rod, a threaded rod, a linking horizontal rod connecting the support rod and the threaded rod in parallel position, the threaded rod having at top a wheel with a upright grip to rotate the threaded rod;

a movable seat unit consisting of a main seat combined with the support rod and the threaded rod of the adjusting frame, a rear seat and two front seats connected with the main seat, an adjusting horizontal threaded rod with a round grip respectively provided in the rear seat and in the front seats so as to adjust the Position of the three seats in accordance with the hole distance and to mesh the main gear with the two auxiliary gears properly;

a transmitting device consisting of a speed reducing motor fixed on the rear seat, a main gear fixed in a bottom of the rear seat, two auxiliary gears fixed in the two front seats, a drill chuck fixed on a bottom end of a shaft of each auxiliary gear for holding a drill;

a drill held in each said drill chuck, having a circular blade of a same height around the circumferential edge of the end, a tapered edge around the circular blade tip, a central projecting point extending below the circular blade, and an annular groove defined between the central projecting point and the circular blade, and said adjusting threaded rod being rotated by the grip of the wheel on top to move the movable seat unit up and down with the two drills for adjusting the distance between said drills to suit to the hole distance of papers to be punched so that many sheets of papers may be punched at a time.

* * * * *

UNITED STATES PATENT AND TRADEMARK OFFICE
CERTIFICATE OF CORRECTION

PATENT NO. : 5,277,524
DATED      : January 11, 1994
INVENTOR(S) : CHING-PAO CHUANG It is certified that error appears in the above-identified patent and that said Letters Patent is hereby corrected as shown below:

On the title page, Item
[76]   Delete the name of the inventor "CHING-PAO CHUNG" and insert therefor --CHING-PAO CHUANG--.

Signed and Sealed this

Fifth Day of July, 1994

*Attest:*

BRUCE LEHMAN

*Attesting Officer*     Commissioner of Patents and Trademarks